Patented Nov. 24, 1942

2,302,743

UNITED STATES PATENT OFFICE 2,302,743

PLASTICIZER AND PLASTIC COMPOSITION

Thomas F. Carruthers, South Charleston, and Charles M. Blair, Charleston, W. Va., assignors to Carbide and Carbon Chemicals Corporation, a corporation of New York No Drawing. Application June 23, 1938, Serial No. 215,406

7 Claims. (Cl. 260—36)

This invention relates to reaction products of halogen esters of polyhydric alcohols with polybasic acids, and has for its principal object the provision of a new class of compounds which are excellent plasticizers for many different plastic materials. These compounds are especially suitable as plasticizers for such materials as the cellulose esters, particularly the nitrate and acetate, and the alkyd and vinyl resins. Of the latter the vinyl ester resins, such as polyvinyl chloride, and the products which may result from the conjoint polymerization of a vinyl halide with a vinyl ester of a lower aliphatic acid, (particularly vinyl chloride with vinyl acetate) are preferred. Other advantages and objects of the invention will be apparent from the following description.

The products of this invention are made by reacting the halogen mono-esters of polyhydric alcohols, which may be referred to as halohydrins, with polycarboxylic acids. In particular, the chloresters of polyhydric alcohols, such as ethylene chlorhydrin, diethylene chlorhydrin (beta-chlorethyl beta-hydroxyethyl ether) and the like, are preferred, and the polycarboxylic acids reacted therewith are preferably of the dicarboxylic type, such as phthalic, maleic and succinic acids. Ordinarily it is more convenient to employ the anhydride rather than the acid itself in the preparation of these esters and, accordingly, the anhydrides of the acids are used in the following examples which serve to illustrate the invention.

Example I.—Di(chlorethyl) phthalate

| | Parts by weight |
|---|---|
| Phthalic anhydride _____ 5 mols__ | 740 |
| Ethylene chlorhydrin _____ 10 mols__ | 850 |
| Sulfuric acid _____ | 9.0 |
| Benzene _____ | 264 |

The above materials were refluxed together and the water formed was removed from the system as an azeotropic mixture with the benzene. The maximum reaction temperature was 200° C. The reaction mixture was freed of benzene and unreacted chlorhydrin by distillation and then neutralized with sodium carbonate and finally distilled under reduced pressure. The yield was 42% of the theoretical.

The product is a viscous, water-white and practically odorless liquid. It is immiscible with water and has a specific gravity of 1.324 at 20°/20° C. Under a pressure of 6.5 mm. of mercury the product boils at 208° to 210° C., and has a vapor pressure of 2.5 mm. at 189° C. The saponification equivalent of the product was found to be 72.56, as compared to the theoretical value of 72.72, and it probably has the following structure:

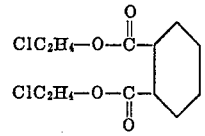

Example II.—Di(chlorethyl) succinate

| | Parts by weight |
|---|---|
| Ethylene chlorhydrin _____ | 1355 |
| Succinic acid _____ | 944 |
| Sulfuric acid _____ | 4.4 |
| Benzene _____ | 440 |

The procedure was the same as in Example I, and the yield was 1181 parts by weight or 61%. The product is a water-white liquid, immiscible with water, gasoline or mineral oil. It has a specific gravity of 1.306 at 20°/20° C. and boils at 150° C. under a pressure of 2 mm. of mercury. The probable structure of the compound is:

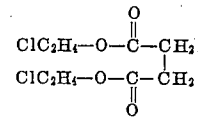

Example III.—Di(chlorethoxyethyl) phthalate

| | Parts by weight |
|---|---|
| Diethylene chlorhydrin _____ | 2350 |
| Phthalic anhydride _____ | 1332 |
| Sulfuric acid _____ | 7.4 |
| Toluene _____ | 565 |

The above materials were refluxed together and the water formed was removed from the system as an azeotropic mixture with the toluene. The product, which is extremely high boiling, was recovered by neutralizing the reaction mixture and distilling off the toluene and unreacted chlorhydrin. The yield was 2949 parts by weight, or 86.4%.

The product is a viscous yellow liquid having a very faint odor, and is immiscible with water, gasoline or mineral oil. It has a specific gravity of 1.277 at 20°/20° C., and an indefinite freezing point due to gelling. Under a pressure of 2.4 mm. of mercury the product boils at 235° to 245° C. with some decomposition. The probable structure of the compound is:

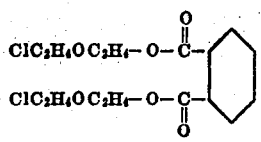

*Example IV.—Di(chlorethoxyethyl) maleate*

| | Parts by weight |
|---|---|
| Diethylene chlorhydrin | 915 |
| Maleic anhydride | 343 |
| Sulfuric acid | 2.5 |
| Toluene | 390 |

The procedure was the same as in Example II, and the yield was 820 parts by weight, or 71.3%. The product is a viscous yellow liquid, odorless, and immiscible with water, gasoline or mineral oil. It has a specific gravity of 1.271 at 20°/20° C., and its freezing point is indefinite due to gelling.

The probable structure of the compound is:

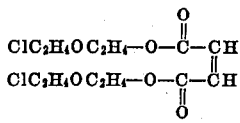

*Example V.—Di(chlorethoxyethoxyethyl) phthalate*

| | Parts by weight |
|---|---|
| Triethylene chlorhydrin | 707 |
| Phthalic anhydride | 296 |
| Sulfuric acid | 3 |
| Toluene | 345 |

The procedure was the same as in Example II, and the yield was 665 parts by weight, or 71.2%. The product is a viscous, yellow liquid with very faint odor. It is immiscible with water, gasoline or mineral oil, and has a specific gravity of 1.249 at 20°/20° C. Its freezing point is indefinite due to gelling.

The probable structure of the compound is:

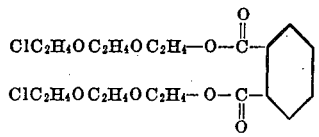

Although some of these esters were yellow as prepared, their color may be lightened by treatment with an aqueous solution of a permangnate salt or by distillation at very low pressures.

All of the products described in the above examples are compatible in large amounts with a variety of cellulose derivatives including the nitrate and acetate esters, cellulose ethers, alkyd resins, polymeric vinyl chloride, and the conjoint polymerization products of a vinyl halide with a vinyl ester of a lower aliphatic acid, and particularly compatible with conjoint polymers of vinyl chloride and vinyl acetate containing between 70% and 95% vinyl chloride in the polymer. The latter resins, when plasticized with the above compounds, especially the chloresters of phthalic acid, yield compositions which are useful for a number of applications. When highly plasticized, as by incorporating up to 50% by weight of plasticizer, these compositions exhibit many of the characteristics of rubber, especially elasticity and resistance to abrasion. For uses not requiring a great amount of elasticity, such as lacquers and molding compounds, less plasticizer may be used. All of these compositions will resist the action of gasoline and oils.

The esters of ethylene chlorhydrin and diethylene chlorhydrin, described above, are especially good plasticizers for polyvinyl chloride, and compositions containing from 25% to 40% by weight of plasticizer are rubber-like masses having good elasticity, resistance to oils, gasoline and mechanical abrasion.

Although the preparation of only the chloresters is given, other halogen esters of polyhydric alcohols may be used. Also, halohydrins of other polyhydric alcohols than the ethylene glycols may be employed, and these compounds may be classified generally as the alkylene and polyalkylene halohydrins. Examples of these are propylene chlorhydrin, dipropylene chlorhydrin, butylene chlorhydrin, the glyceryl chlorhydrins, and the like. Similarly, the use of other polybasic acids, such as tartaric, citric, oxalic and the like is within the scope of this invention, although the most suitable plasticizers are those made with phthalic, maleic, and succinic acids, of which the phthalic acid esters are preferred. It has been found that, in general, the aromatic acid esters have more plasticizing power than the aliphatic acid esters, but both types have the same general characteristics and may be used interchangeably.

These reaction products of halogen monoesters of polyhydric alcohols and pilycarboxylic acids are extremely high boiling liquids, and hence are retained almost indefinitely by compositions containing them. They are insoluble in gasoline and oils, thus making them valuable plasticizers in compositions used to replace rubber in such applications as oil and gasoline hose, gaskets, cable coatings and the like. On the other hand, these compounds are soluble in a number of solvents such as ketones, esters and aromatic hydrocarbons, so that lacquer compositions may be formulated from the solvents generally used for that purpose.

Other modifications will be apparent and the invention should not be limited other than as defined in the appended claims.

We claim:

1. A plastic composition containing as essential ingredients thereof a vinyl resin and a compound intimately incorporated therein as a plasticizer, said compound being of the formula

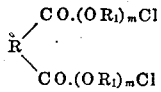

where R is a hydrocarbon radical to which the carbonyl groups are attached at adjacent carbon atoms, $R_1$ is an non-cyclic 1,2 alkylene radical of from 2 to 4 carbon atoms, and $m$ is an integer from 1 to 3.

2. A plastic composition containing as essential ingredients thereof a vinyl resin and a compound intimately incorporated therein as a plasticizer, said compound being of the formula

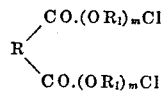

where R is an aromatic hydrocarbon radical to which the carbonyl groups are attached at adjacent carbon atoms, $R_1$ is a non-cyclic 1,2 alkylene radical of from 2 to 4 carbon atoms, and $m$ is an integer from 1 to 3.

3. A plastic composition containing as essential ingredients thereof a vinyl resin and a compound intimately incorporated therein as a plasticizer, said vinyl resin being a conjoint polymer of a vinyl halide and a vinyl ester of a lower aliphatic acid, and said compound being of the formula

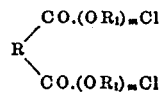

where R is a hydrocarbon radical to which the carbonyl groups are attached at adjacent carbon atoms, $R_1$ is a non-cyclic 1,2 alkylene radical of from 2 to 4 carbon atoms, and $m$ is an integer from 1 to 3.

4. A plastic composition containing as essential ingredients thereof a vinyl resin and a compound intimately incorporated therein as a plasticizer, said vinyl resin being a conjoint polymer of vinyl chloride and vinyl acetate, and said compound being of the formula

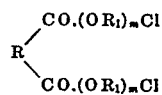

where R is an aromatic hydrocarbon radical to which the carbonyl groups are attached at adjacent carbon atoms, $R_1$ is a non-cyclic 1,2 alkylene radical of from 2 to 4 carbon atoms, and $m$ is an integer from 1 to 3.

5. A plastic composition containing as essential ingredients thereof a vinyl resin and a compound intimately incorporated therein as a plasticizer, said vinyl resin being a conjoint polymer of vinyl chloride and vinyl acetate, and said compound being of the formula

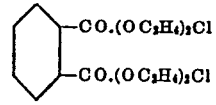

6. A plastic composition containing as essential ingredients thereof a vinyl resin and a compound intimately incorporated therein as a plasticizer, said vinyl resin being a conjoint polymer of vinyl chloride and vinyl acetate, and said compound being of the formula

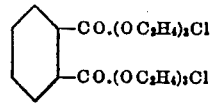

7. A plastic composition containing as essential ingredients thereof a vinyl resin and a compound intimately incorporated therein as a plasticizer, said vinyl resin being a conjoint polymer of vinyl chloride and vinyl acetate, and said compound being of the formula

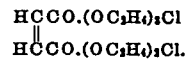

THOMAS F. CARRUTHERS.
CHARLES M. BLAIR.

CERTIFICATE OF CORRECTION.

Patent No. 2,302,743.  November 24, 1942.

THOMAS F. CARRUTHERS, ET AL.

It is hereby certified that error appears in the printed specification of the above numbered patent requiring correction as follows: Page 1, second column, line 55, for "2.4" read --2.5--; page 2, second column, line 31, for "pilycarboxylic" read --polycarboxylic--; page 3, second column, line 28, claim 7, for that portion of the formula reading "$(OC_2H_4)_3$" read --$(OC_2H_4)_2$--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.